(12) United States Patent
Wang et al.

(10) Patent No.: US 11,811,660 B2
(45) Date of Patent: *Nov. 7, 2023

(54) FLOW CLASSIFICATION APPARATUS, METHODS, AND SYSTEMS

(71) Applicant: Intel Corporation, Santa Clara, CA (US)

(72) Inventors: Ren Wang, Portland, OR (US); Tsung-Yuan C. Tai, Portland, OR (US); Yipeng Wang, Portland, OR (US); Sameh Gobriel, Dublin, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/396,553

(22) Filed: Aug. 6, 2021

(65) Prior Publication Data

US 2021/0367887 A1 Nov. 25, 2021

Related U.S. Application Data

(63) Continuation of application No. 15/638,102, filed on Jun. 29, 2017, now Pat. No. 11,088,951.

(Continued)

(51) Int. Cl.
  *H04L 45/7453* (2022.01)
  *H04L 47/2441* (2022.01)
  (Continued)

(52) U.S. Cl.
  CPC ........ *H04L 45/7453* (2013.01); *H04L 45/745* (2013.01); *H04L 47/2441* (2013.01);
  (Continued)

(58) Field of Classification Search
  CPC .............. H04L 45/7453; H04L 45/745; H04L 47/2441; H04L 61/10; H04L 45/02; H04L 61/5046
  (Continued)

(56) References Cited

U.S. PATENT DOCUMENTS

6,778,984 B1  8/2004  Lu et al.
6,922,410 B1  7/2005  O'Connell
(Continued)

FOREIGN PATENT DOCUMENTS

CN    101937448 A    1/2011
CN    104504038 A    4/2015

OTHER PUBLICATIONS

"International Application Serial No. PCT/US2017/064235, International Search Report dated Apr. 18, 2018", 3 pgs.
(Continued)

*Primary Examiner* — Rownak Islam
(74) *Attorney, Agent, or Firm* — Compass IP Law PC

(57) ABSTRACT

Apparatus, methods, and systems for tuple space search-based flow classification using cuckoo hash tables and unmasked packet headers are described herein. A device can communicate with one or more hardware switches. The device can include memory to store hash table entries of a hash table. The device can include processing circuitry to perform a hash lookup in the hash table. The lookup can be based on an unmasked key include in a packet header corresponding to a received data packet. The processing circuitry can retrieve an index pointing to a sub-table, the sub-table including a set of rules for handling the data packet. Other embodiments are also described.

18 Claims, 4 Drawing Sheets

Related U.S. Application Data

(60) Provisional application No. 62/446,656, filed on Jan. 16, 2017.

(51) Int. Cl.
*H04L 45/745* (2022.01)
*H04L 61/10* (2022.01)
*H04L 61/5046* (2022.01)
*H04L 45/02* (2022.01)

(52) U.S. Cl.
CPC .............. *H04L 61/10* (2013.01); *H04L 45/02* (2013.01); *H04L 61/5046* (2022.05)

(58) Field of Classification Search
USPC .......................................................... 370/392
See application file for complete search history.

(56) References Cited

U.S. PATENT DOCUMENTS

| | | | |
|---|---|---|---|
| 6,990,102 | B1 | 1/2006 | Kaniz et al. |
| 10,318,587 | B1 | 6/2019 | Bosshart et al. |
| 2002/0133619 | A1 | 9/2002 | Lin et al. |
| 2004/0190526 | A1* | 9/2004 | Kumar ................ H04L 47/2441 370/395.32 |
| 2007/0201458 | A1 | 8/2007 | Thron et al. |
| 2012/0102298 | A1 | 4/2012 | Sengupta et al. |
| 2013/0282965 | A1 | 10/2013 | Sengupta et al. |
| 2014/0122735 | A1 | 5/2014 | Jokinen et al. |
| 2014/0223030 | A1 | 8/2014 | Bhaskar et al. |
| 2015/0052309 | A1 | 2/2015 | Philip et al. |
| 2015/0092778 | A1 | 4/2015 | Jackson et al. |
| 2015/0244842 | A1* | 8/2015 | Laufer .................... H04L 69/22 370/392 |
| 2015/0341473 | A1 | 11/2015 | Dumitrescu et al. |
| 2015/0370495 | A1 | 12/2015 | Georgiev |
| 2016/0241475 | A1 | 8/2016 | Wang et al. |
| 2017/0052731 | A1 | 2/2017 | Levy et al. |
| 2017/0068669 | A1 | 3/2017 | Levy et al. |
| 2017/0134538 | A1 | 5/2017 | Mahkonen et al. |
| 2018/0068032 | A1* | 3/2018 | Levy .................. H04L 63/0263 |

OTHER PUBLICATIONS

"International Application Serial No. PCT/US2017/064235, Written Opinion dated Apr. 18, 2018", 11 pgs.

Advisory Action for U.S. Appl. No. 15/638,102, dated Sep. 24, 2020, 3 pages.

Dharmapurikar, Sarang, et al., "Longest Prefix Matching Using Bloom Filters", SIGCOMM 2003, Karlsruhe, Germany, (Aug. 25-29, 2003), 201-212.

DPKD, Intel, "DPKD: Data Plane Development Kit", URL: https://www.intel.com/content/www/us/en/communications/data-plane-development-kit.html, (accessed May 7, 2018), 4 pgs.

Final Office Action for U.S. Appl. No. 15/638,102, dated Jun. 15, 2020, 41 pages.

First Office Action for U.S. Appl. No. 15/638,102, dated Feb. 20, 2020 40 pages.

Lee, Hyunyong, et al., "Approaches for Improving Tuple Space Search-based Table Lookup", ICTC, (2015), 6 pgs.

Notice of Allowance for U.S. Appl. No. 15/638,102, dated Apr. 7, 2021, 15 pages.

Pfaff, Ben, et al., "The Design and Implementation of Open vSwitch", 12th USENIX Symposium on Networked Systems Design and Implementation (NSDI '15), (2015), 13 pgs.

Scheurich, Jan, et al., "OvS-DPDK performance optimizations to meet Telco needs", http://www.openvswitch.org//support/ovscon2016/8/1400-gray.pdf, (2016), 22 pgs.

Second Office Action for U.S. Appl. No. 15/638,102, dated Oct. 28, 2020, 45 pages.

Vamanan, Balajee, et al., "EffiCuts: Optimizing Packet Classification for Memory and Throughput", SIGCOMM 2010, New Delhi, India, (Aug. 30-Sep. 3, 2010), 12 pgs.

Zhou, Dong, et al., "Scalable, high performance ethernet forwarding with CuckooSwitch.", CoNEXT '13, Santa Barbara, CA, (Dec. 9-12, 2013), 12 pgs.

OvS Open vSwitch, "Production Quality, Multilayer Open Virtual Switch", https://www.openvswitch.org/, 2011, 2 pages.

Chinese and English Translation of P.R. China State Intellectual Property Office First Office Action for Patent Application No. 201780077572.1, dated Sep. 29, 2022, 18 pages.

* cited by examiner

FLOW CLASSIFICATION APPARATUS, METHODS, AND SYSTEMS

CROSS-REFERENCE TO RELATED APPLICATION

This patent application is a continuation of U.S. patent application Ser. No. 15/638,102, filed Jun. 29, 2017. U.S. patent application Ser. No. 15/638,102 claims the benefit of U.S. Provisional Patent Application No. 62/446,656, filed Jan. 16, 2017, entitled "TUPLE SPACE SEARCH-BASED FLOW CLASSIFICATION USING CUCKOO HASH TABLES AND UNMASKED PACKET HEADERS". The entire specifications of which are hereby incorporated herein by reference in their entirety.

TECHNICAL FIELD

Embodiments described herein relate generally to processing of data packets sent or received through a network. Some embodiments relate to flow classification.

BACKGROUND

Emerging network trends in both data center and telecommunication networks place increasing performance demands on flow classification, which forms a part of many software packet-processing workloads. Thus, ongoing efforts are directed to improving the speed of flow classification.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Routers are packet processing nodes used in data centers to route data packets to their destinations, and packet classification is the process of categorizing data packets into flows. Routers in the context of embodiments can also include devices such as switches and firewalls. All packets that belong to the same flow are processed in a similar manner by the router according to a rule. Packet classification solves the technical problem of determining the highest-priority rule out of a set of rules that can be applied to a particular data packet, where each matching rule specifies a desired action to be taken over a set of packets identified by a combination of packet fields. Packet classification techniques can be applied to implement Quality of Service (QoS) policies, network monitoring, and traffic analysis, among other uses.

Some data centers use top-of-rack (ToR) switches and special function hardware to provide packet classification, among other applications. However, customers may experience reduced functionality caused by hardware limitations, including limited memory, limited Ternary Content-Addressable Memory (TCAM), a reduced number of supported data flows, etc. Furthermore, hardware switches may be overly rigid with respect to packet parsing, and hardware switches can exhibit a general lack of platform flexibility and configurability.

With the rise of virtualization, many data centers have increasingly made use of Software Defined Networking (SDN) and Network Function Virtualization (NFV), which in turn leads to increased usage of software-based configurable routers and switches. Software flow classification is often used in systems implementing SDN. Software flow classification can include tree-based approaches, or can be hash table-based, among other possibilities.

Tuple Space Search for Flow Classification with Wild Card Support

Figure 1:
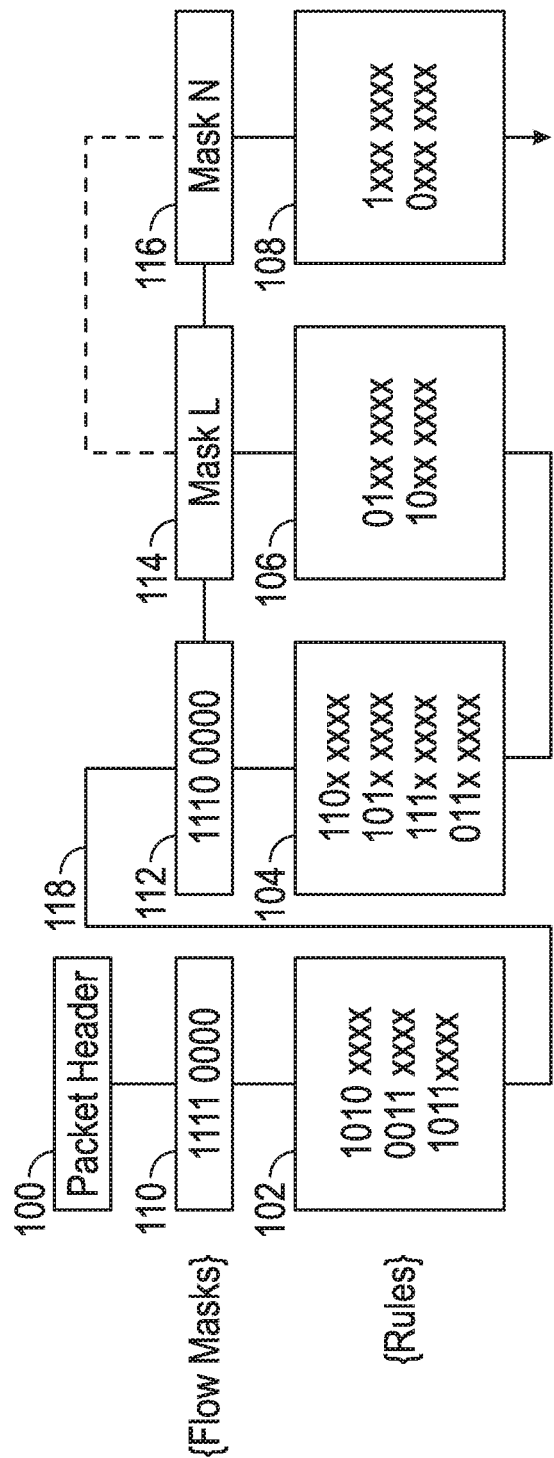
FIG. 1 illustrates a tuple space search (TSS) for flow classification with wild card support.

One example of a hash table-based approach is a tuple space search (TSS). FIG. 1 illustrates a tuple space search (TSS) for flow classification with wild card support.

A packet header 100 is received at an input of a networking device (e.g., a router, not shown in FIG. 1). In TSS, rules (e.g., Open Flow rules, internet protocol (IP) version 4 (IPv4) rules, etc.) are divided into a series of sub-tables 102, 104, 106, 108 based on their wildcard format. For example, all rules with the same wildcard positions are placed in the same sub-table 102, 104, 106 and 108. Using sub-table 102 as an example, all rules in sub-table 102 have wildcard positions (denoted by "xxxx" in FIG. 1) in the lower nibble of the illustrated byte. While only one byte is illustrated, it will be appreciated that rules can have any number of bytes.

A flow mask 110, 112, 114, 116 is provided or stored for each sub-table 102, 104, 106, 108 such that, when masking a packet header 100 according to the flow mask 110, 112, 114, 116, only bits other than the wildcard bits will be used to search for a rule in the pertinent sub-table 102, 104, 106, 108. Algorithms that implement TSS then sequentially search through all the sub-tables (for each flow mask 110, 112, 114, 116) until a match is found.

For example, a search for a rule can proceed according to path 118 shown in FIG. 1. Given the packet header 100, the packet header 100 is first masked using flow mask 110, and the rules of sub-table 102 are then searched for a match with the masked packet header. If a rule is not found in sub-table 102, flow mask 112 can be applied to the packet header 100 and the rule pertaining to the packet header 100 will be searched for within sub-table 104. This process may continue for each of the sub-tables 106, 108 until a match is found or there is a miss (e.g., no match is found).

Each sub-table 102, 104, 106, 108 can be implemented as a hash table. When a packet is received, a sub-table key can be formed based on a first sub-table mask (e.g., flow mask 110) to perform a hash lookup for the respective sub-table 102, 104, 106, 108.

TSS is useful, but can be inefficient. The sequential search of multiple sub-tables 102, 104, 106, 108 can introduce significant system processing overhead. Additionally, creating sub-table keys provides further overhead to TSS-based processes, particularly when the packet header 100 is long. As one example, in some implementations, headers can include 512 bytes. Further, the sub-tables used can be memory-inefficient, which becomes important when attempting to achieve large scale storage or to fit lookup tables into fast, expensive static random-access memory (SRAM).

Cuckoo Hash Table

Figure 2:
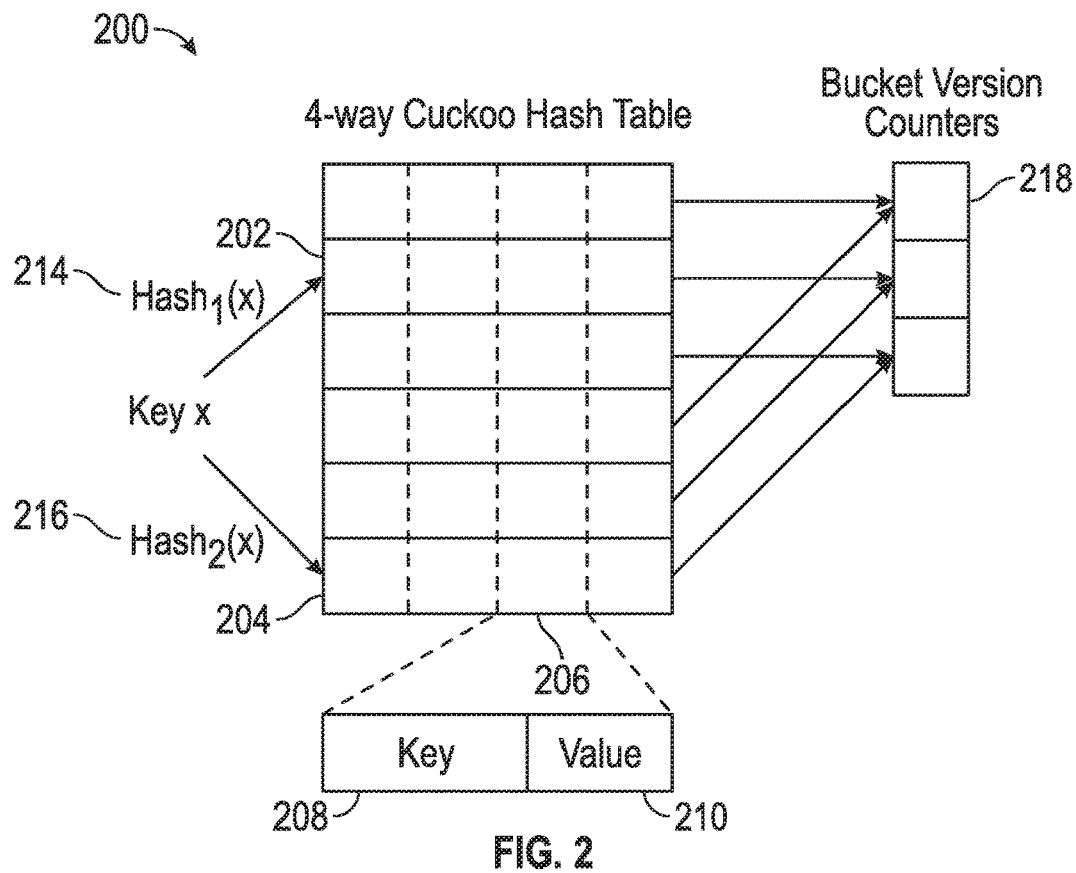
FIG. 2 illustrates a two-hash function, four-way cuckoo hash table in accordance with some embodiments.

FIG. 2 illustrates a two-hash function (e.g., hash functions 214, 216), four-way cuckoo hash table 200 in accordance with some embodiments. Cuckoo hashing is a form of open addressing in which each non-empty cell of a hash table includes a key or key-value pair. However, open addressing suffers from collisions, which can happen when more than one key is mapped to the same location. The basic idea of cuckoo hashing is to resolve collisions by using two hash functions instead of only one. This provides two possible locations in the hash table for each key. Cuckoo hashing can achieve high memory efficiency with a guarantee of O(1) retrieval times (e.g., lookup requires a constant time in the worst case). This is in contrast to other hash table algorithms, which may not have a bound worst-case scenario for the amount of time needed to do a lookup.

As shown in FIG. 2, and in contrast with the hashing described above with reference to FIG. 1, cuckoo hashing maps each key (Key x) to multiple candidate locations (202, 204) by hashing (using, e.g., hash functions 214, 216) and storing this item in one of its locations 202, 204. These locations 202, 204 can be referred to as a primary location and a secondary location. While two locations are shown, four locations or more can also be provided.

A group of locations can be referred to as a bucket. For example, the cuckoo hash table 200 can include at least two buckets (visualized as the rows of cuckoo hash table 200). The number of locations in a bucket can be configured for memory storage efficiency. In some examples, the number of locations can be configured so that the data structure is aligned with cache lines (e.g., the data structure is cache-aligned). In some embodiments, each bucket is aligned to cache lines of 64 bytes, although embodiments are not limited thereto.

Each non-empty cell of a hash table (e.g., cell 206) contains a key 208 or a data pair including a key 208 and value 210. With additional reference to FIG. 1, the key 208 can include the full flow key without any flow mask (e.g., flow mask 110, 112, 114, 116) being applied. The value 210 can include an indicator of the target sub-table (e.g., sub-table 102, 104, 106, 108).

Hash functions 214, 216 can be used to determine the location for each key. Inserting a new item (e.g., a key 208 or a pair comprising the key 208 and value 210) may include relocating (e.g., displacing) existing items already within the table to alternate candidate locations within the table. To help ensure that readers of the cuckoo hash table 200 are obtaining consistent data with respect to writers to the cuckoo hash table 200, each of the buckets can be associated with a version counter 218 so that readers can detect any change made while they are using one of buckets. A writer to the cuckoo hash table 200 can increment the version counter 218 when the writer modifies any of the buckets, either by inserting a new item into an empty location or by displacing an existing item, as described later herein. A reader can then take a snapshot of the version counter(s) and compare version counters 218 before and after reading from any of the buckets. In this way, readers can detect read-write conflicts based on version changes. In order to reduce memory usage, each version counter 218 can be shared by multiple buckets using, for example, striping. Other embodiments can ensure consistent data by making use of advanced vector extension (AVX) atomic instructions or TSX (transactional memory), which reduce the overhead of maintaining version counters.

Cuckoo Distributor

Embodiments provide a hierarchical approach to avoid the TSS sequential sub-table lookup described above with reference to FIG. 1. Some embodiments provide a low-overhead, space-efficient cuckoo hash table-like data structure (e.g., a hash table similar to the cuckoo hash table 200 (FIG. 2)) that more quickly directs incoming flow searches to a corresponding sub-table. By using a data structure in accordance with the methods of various embodiments, switches or other apparatuses can be configured to more quickly determine which specific sub-table to search without searching other sub-tables and without creating a sub-table key as described earlier herein with respect to TSS-based methods. Therefore, switches and other apparatuses can more quickly determine packet processing rules for incoming data packets, such as flow routing rules, etc. As a result, the operating efficiency of various apparatus and systems is improved.

Figure 3:
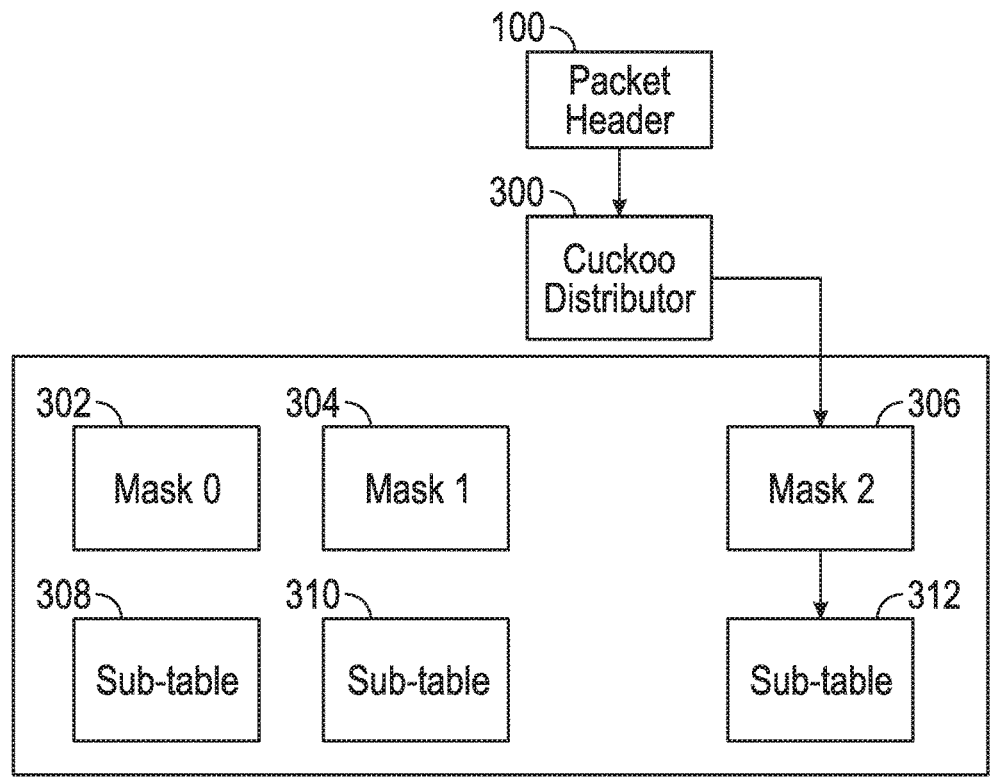
FIG. 3 illustrates use of a cuckoo distributor (CD) scheme as a first level lookup for a TSS in accordance with some embodiments.

FIG. 3 illustrates use of a CD scheme as a first level lookup for TSS in accordance with some embodiments. An example method can use such a scheme (e.g., the CD scheme, although other terms can be used to describe similar algorithms) as a first level redirection table. A scheme in accordance with various embodiments can employ a similar (or simpler) data structure as that of the cuckoo hash table 200 described with reference to FIG. 2.

Referring now to FIG. 3, a packet (having packet header 100) is received (e.g., at switch interface 604 (FIG. 6)) and provided to CD 300. Processing circuitry (e.g., processing circuitry 620 (FIG. 6)) in accordance with various embodiments will perform a quick hash lookup in the CD 300 using an unmasked full key (in order to avoid forming a masked key) to retrieve a value pointing to the sub-table (e.g., sub-table 312) that includes a rule for processing the corresponding flow. In some embodiments, the unmasked full key will include the original flow key. In some embodiments, the output value of CD 300 will be masked by one of masks 302, 304, 306 before search in sub-table 308, 310, 312. Accordingly, various method embodiments can avoid searching through multiple sub-tables (e.g., other sub-tables 308, 310). Because the CD 300 is a first-level filter to point to a sub-table comprised of packet processing rules, in the event that the CD 300 provides an erroneous result, standard sequential table searches (e.g., TSS) can be implemented by apparatuses and methods in accordance with various embodiments.

Figure 4:
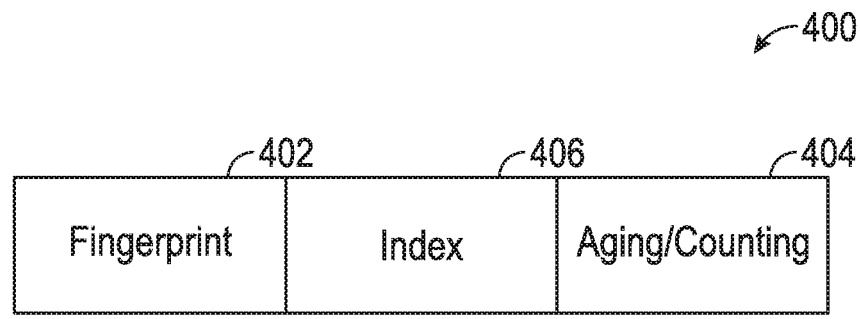
FIG. 4 illustrates an entry format in accordance with some embodiments.

FIG. 4 illustrates an entry format of a CD in accordance with some embodiments. Each entry 400 of the CD can include a small fingerprint 402 (e.g., less than the size of a full packet header 100). For example, when a packet is received by the apparatus 600, processing circuitry 602 of the apparatus 600 can compare a signature of the packet to fingerprints 402 to determine the correct CD entry to which the packet belongs. Each entry 400 can further include an aging field 404 to facilitate the eviction of inactive (e.g., "stale") flows, as well as an index 406. The index 406 can include an indicator to identify the sub-table (e.g., sub-table 308, 310, 312) in which rules for a corresponding packet will be found. In some embodiments, each entry consists of four bytes, with two bytes for fingerprint 402, and one byte each for the aging field 404 and the index 406. However, embodiments are not limited to any particular size of entries 400 or to any particular number or identity of fields included in the entries 400. In at least these embodiments, one cache line can include 16 entries as one bucket. AVX comparing instructions can be used to compare the 16 entries in parallel.

Example methods in accordance with some embodiments can include a learning phase, in which the CD 300 is initially filled with entries, and during which TSS is used to learn sub-table indices, etc. for incoming packet headers. For example, upon receiving an incoming packet header, processing circuitry 602 of the apparatus 600 may use TSS to discover which sub-table contains the correct rule. Once a sub-table, rule, or other value has been learned for a first packet header, those learned values are stored in, for example, the CD 300. Processing of subsequently-received data packets having the same or similar headers as previously-received packet headers can then proceed more rapidly using the CD 300 and methods in accordance with some embodiments.

Other Example Methods

In addition to the lookup operations described above, CD operations can further include insertion and eviction (e.g., deletion) operations. In a network, new packet flows can emerge and old packet flows can become inactive. Computational resources can be wasted in storing and maintaining rules for processing old flows. Insertion of new flows, and deletion of old flows, should be performed with reduced computational cost.

In current cuckoo hash table implementations, when a new key is to be inserted, a hash is first calculated and a potential bucket or set of buckets is identified, based on the calculated hash value. If one of the potential buckets has available space (e.g., empty entries), the key is placed in that bucket.

If all potential buckets are full, one entry is moved to an alternative bucket to accommodate the new entry. This is called a key displacement process. The process continues in the same way until an empty entry is found, forming a "cuckoo path" completing the insertion process. Some systems provide for an optimization of this insertion process for network switching. However, when bucket occupancy is high, in some cases, a cuckoo path could be quite long, and thus, the key displacement process could be time consuming. In some embodiments, to guarantee fast insertion, the length of the cuckoo path is limited to either zero or one to improve insertion speed with minimum impact on the table occupancy. In some embodiments, the cuckoo path is set as a configurable system parameter.

In a first subset of embodiments, key displacement is not allowed when there is collision (e.g., for performance purposes, because key displacement is relatively slow). Collisions can occur when more than one flow hashes into the same bucket (e.g., a row of the cuckoo hash table 200 (FIG. 2)) and the flows include the same fingerprint (e.g., fingerprint 402). In a second set of embodiments, key displacement is allowed once. In the first set of embodiments, this can be viewed as a regression of a cuckoo hash table, where two hash functions (e.g., two locations for one key) are used but there is no key replacement.

When a bucket is full and no key can be displaced, an eviction is triggered to evict an old, inactive flow (or keys or other values related to the old, inactive flow) to accommodate the new flow. For eviction, similar to CPU caching, a pseudo least recently used (LRU) policy is implemented. An age field (e.g., age field 404 (FIG. 4)) is maintained and when a new flow is inserted or an existing flow is accessed, the age for the corresponding new flow is set to the youngest, while all other entries in the same bucket will age by 1. When needed, the entry with the oldest age will be evicted. According to some embodiments, eviction happens on demand when it is needed, rather than periodically, because periodic eviction could incur many read and store operations to different cache lines, resulting in high overhead.

In some embodiments, any key is allowed to be displaced only once. A flag bit is set after a key is moved from a primary bucket to a secondary bucket. In other embodiments, one of two buckets is chosen for insertion and a key is not displaced after insertion, similar to an Exact Match Cache (EMC) design used by Open vSwitch (OvS®), from Apache® Software Foundation of Forest Hill, Maryland, United States. These embodiments can provide faster insertion speeds by avoiding a long chain of key displacement operations. Additionally, these embodiments do not engage in repetitious key displacement and therefore there is no need to store a key or its alternative signature in the table to calculate the key's alternative bucket, again and again. In any case, cache design can provide a wide 16-way association in some embodiments, which helps prevent hash collisions, and therefore occupancy and performance are not impacted by limiting the key displacement length. In the event collision does occur, and a wrong sub-table index is retrieved, some embodiments can fall back to the usage of standard TSS as may be used in FIG. 1.

Figure 5:
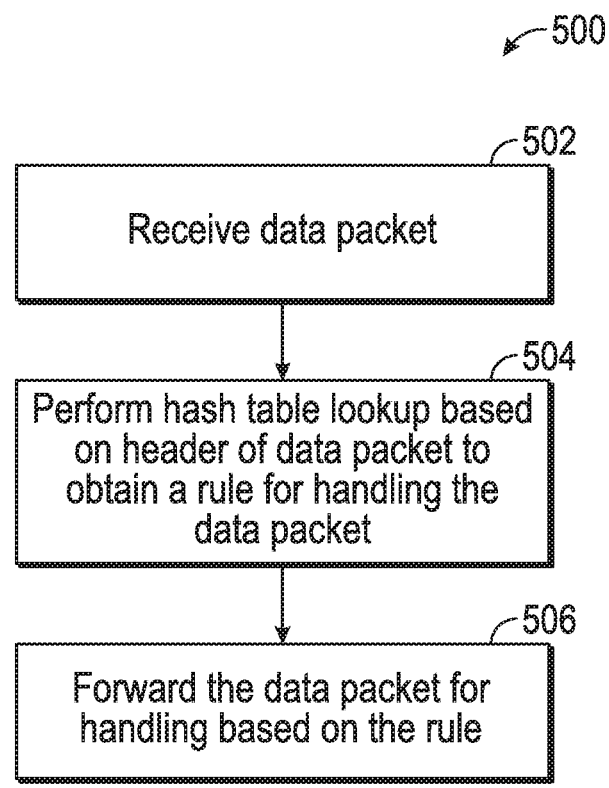
FIG. 5 illustrates an example method in accordance with some embodiments.

FIG. 5 illustrates an example method 500 in accordance with some embodiments. The example method 500 can make use of any of the tables, methods, and hashing algorithms described above.

The example method 500 can begin with a device (e.g., the apparatus 600 (FIG. 6)) receiving a data packet at operation 502. As described above, the data packet can include a packet header. The example method 500 can continue with operation 504, where the apparatus 600 uses an unmasked key included in the packet header to retrieve, from a hash table, an index pointing to a sub-table. As described above with respect to FIG. 1, the sub-table can include a set of rules for handling the respective data packet. The example method 500 can continue in operation 506 with the apparatus 600 forwarding the data packet for handling based on the rule.

In embodiments, as described above with respect to FIGS. 2 and 3, the hash table can include a cuckoo hash table. The hash table can include entries similar to or identical to those illustrated in FIG. 4 above, e.g., the hash table can include a field to indicate an age of the respective hash table entry, and the hash table entry can include a fingerprint comprised of a subset of the packet header. The example method 500 can include eviction, deletion, and key insertion processes as described earlier herein. For example, the method 500 can include evicting entries from the hash table according to an LRU policy based on an age entry of a respective hash table entry of the hash table. The example method 500 can further include detecting that a rule was not retrieved from the sub-table and implementing a TSS over a plurality of sub-tables responsive to the detecting.

Example Apparatuses

Figure 6:
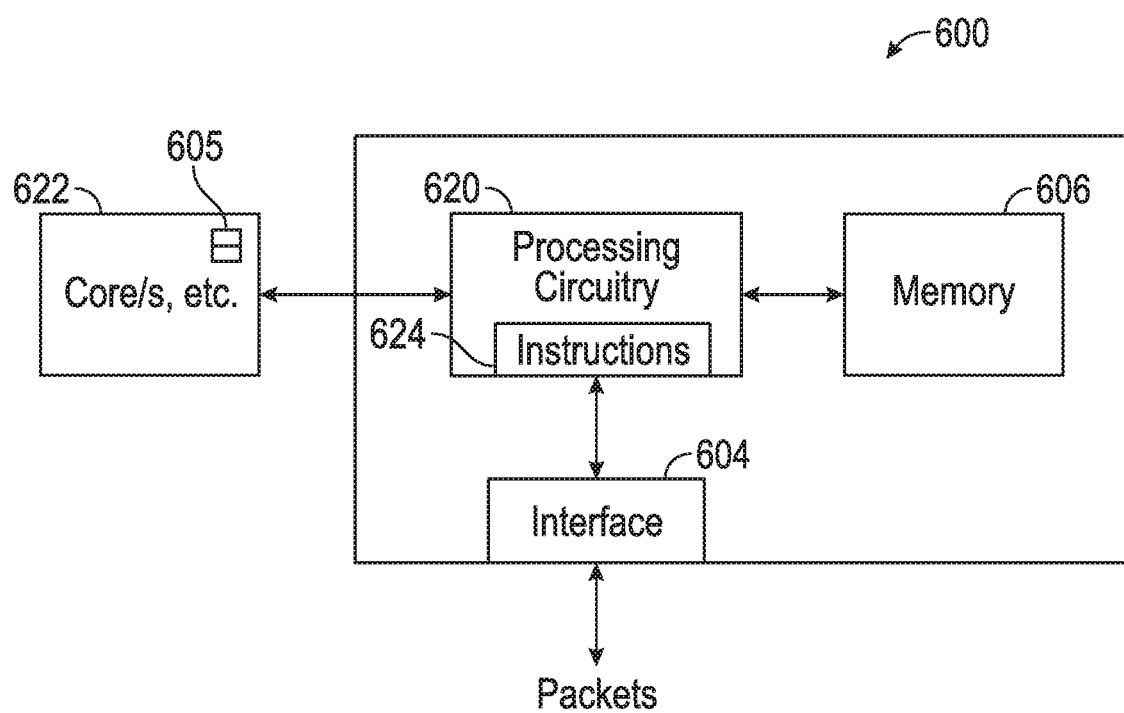
FIG. 6 is a block diagram of an apparatus in accordance with some embodiments.

FIG. 6 illustrates components of an apparatus 600 (e.g., a control device, network interface controller (NIC) or host fabric interconnect (HFI)) for performing methods in accordance with some embodiments. Illustration of the embodiments present only those components necessary for appreciating the depicted embodiments, such that other components are foreseeable, and can be added, without departing from the teachings herein.

The apparatus 600 may include a switch interface 604 to communicate with one or more hardware switches (not shown in FIG. 6) to receive a plurality of data packets. It will be appreciated, however, that the interface shall be provided for any sort of flow classification. For example, flow classification can be provided for any networking appliances that need flow classification (e.g., firewalls, routers, switches, etc.) The apparatus 600 can include memory 606 to store hash table entries (e.g., a plurality of hash table entries) of a hash table. The entries can be configured similarly to the structure shown in FIG. 4. For example, the entries can include a field to indicate an age of the respective hash table entry. The hash table can include a cuckoo hash table as described earlier herein. The hash table entries can include a fingerprint, the fingerprint being comprised of two byes of a packet header (including, e.g., packet identification information) of a respective data packet.

Packet processing can proceed when the switch interface 604 receives packets and pushes them into receive (RX) queues 605 using, for example, Direct Memory Access (DMA). To spread the load of packet processing evenly over core/s (e.g., processing core/s 622), the processing circuitry 620 can use Receive Side Scaling (RSS).

The apparatus can include processing circuitry 620. The processing circuitry 620 can perform a hash lookup in the hash table based on an unmasked key included in a packet header corresponding to a data packet of the plurality of data packets to retrieve an index pointing to a sub-table as described earlier herein with respect to FIG. 3. The sub-table can include a set of rules for handling the respective data packet. The processing circuitry 620 can forward (e.g., to processing core/s 622 or other elements) the respective data packet for handling based on a rule of the set of rules. The processing circuitry 620 can evict entries from the hash table according to an LRU policy based on an age entry of a respective hash table entry of the hash table. The processing circuitry 620 can implement a TSS responsive to detecting that an index was retrieved for an incorrect sub-table. This detecting can be based on error messages from processing core/s 622, or other indicators.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine and that cause the machine to perform any one or more of the techniques of the present disclosure, or that is capable of storing, encoding or carrying data structures used by or associated with such instructions. In other words, the processing circuitry 620 (FIG. 6) can include instructions 624 and can therefore be termed a machine-readable medium in the context of various embodiments. Other non-limiting machine-readable medium examples may include solid-state memories, and optical and magnetic media. Specific examples of machine-readable media may include: a non-transitory machine-readable medium or non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network using a transmission medium utilizing any one of a number of transfer protocols (e.g., frame relay, IP, TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x*standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Examples and Notes

The present subject matter may be described by way of several examples.

Example 1 includes subject matter (such as a device, computer, processor, compute circuitry, etc.) comprising a switch interface to receive a data packet, the data packet including a packet header; and processing circuitry configured to: use an unmasked key included in the packet header to retrieve, from a hash table, an index pointing to a sub-table, the sub-table including a set of rules for handling the data packet; and forward the respective data packet for handling based on a rule of the set of rules.

In Example 2, the subject matter of Example 1 can optionally include a memory to store a plurality of hash table entries of the hash table.

In Example 3, the subject matter of Example 2 can optionally include wherein the memory includes static random-access memory (SRAM).

In Example 4, the subject matter of any of Examples 1-3 can optionally include wherein the hash table comprises a cuckoo hash table.

In Example 5, the subject matter of Example 4 can optionally include wherein the cuckoo hash table comprises a four-way cuckoo hash table.

In Example 6, the subject matter of any of Examples 2-5 can optionally include wherein a hash table entry included in the plurality of hash table entries includes a field to indicate an age of the hash table entry.

In Example 7, the subject matter of any of Examples 1-6 can optionally include wherein the hash table entry includes a fingerprint, the fingerprint comprising a subset of the packet header.

In Example 8, the subject matter of Example 7 can optionally include wherein the fingerprint includes the index.

In Example 9, the subject matter of Example 7 can optionally include wherein the fingerprint includes an aging field to indicate an age of the hash table entry.

In Example 10, the subject matter of any of Examples 1-9 can optionally include wherein the processing circuitry is configured to evict entries from the hash table according to a least recently used (LRU) policy based on an age entry of a hash table entry of the hash table.

In Example 11, the subject matter of any of Examples 1-10 can optionally include wherein the processing circuitry is further configured to implement a tuple space search (TSS) responsive to detecting that the rule of the set of rules was not retrieved from the sub-table.

In Example 12, the subject matter of any of Examples 1-11 can optionally include wherein the hash table comprises at least two buckets of entries, and wherein each bucket comprises a cache-aligned data structure.

In Example 13, the subject matter of Example 12 can optionally include wherein each bucket is aligned with cache lines of 64 bytes.

In Example 14, the subject matter of any of Examples 1-13 can optionally include wherein the set of rules include at least one of Open Flow rules and IPv4 rules.

In Example 15, a method can be performed by a device (e.g., computer, processor, router, hardware switch, fabric interface component, network interface card, network node, etc.) for forwarding packets for processing. The method can include: receiving a data packet at a router, the data packet including a packet header; using a key included in the packet header to retrieve, from a hash table, an index pointing to a sub-table, the sub-table including a set of rules for handling the data packet; and forwarding, by the router to a processor core, the respective data packet for handling based on a rule of the set of rules.

In Example 16, the subject matter of Example 15 can optionally include wherein the hash table includes a four-way cuckoo hash table.

In Example 17, the subject matter of any of Examples 15-16 can optionally include wherein the key is unmasked and a hash table entry in the four-way cuckoo hash table includes a field to indicate an age of the hash table entry.

In Example 18, the subject matter of any of Examples 15-17 can optionally include inserting the key into the hash table.

In Example 19, the subject matter of Example 18 can optionally include wherein inserting comprises replacing another key already located in a desired entry of the key.

In Example 20, the subject matter of any of Examples 15-19 can optionally include updating a version counter subsequent to inserting the key.

In Example 21, the subject matter of any of Examples 15-20 can optionally include using transactional memory instructions to insert the key.

In Example 22, the subject matter of Example 17 can optionally include wherein the hash table entry includes a fingerprint, the fingerprint comprising a subset of the packet header.

In Example 23, the subject matter of Example 22 can optionally include wherein the fingerprint includes two bytes, and wherein the fingerprint indicates identification information of the data packet.

In Example 24, the subject matter of any of Examples 15-23 can optionally include evicting entries from the hash table according to a least recently used (LRU) policy based on an age entry of a hash table entry of the hash table.

In Example 25, the subject matter of any of Examples 15-24 can optionally include detecting that the rule of the set of rules was not retrieved from the sub-table; and implementing a tuple space search (TSS) over a plurality of sub-tables responsive to the detecting.

In Example 26, a non-transitory machine-readable medium stores instructions for execution by a machine (e.g., computer, processor, network node, router, fabric interface, etc.) to cause the machine to perform operations including: receive a data packet, the data packet including a packet header; use an unmasked key included in the packet header to retrieve, from a hash table, an index pointing to a sub-table, the sub-table including a set of rules for handling the data packet; and forward the data packet for handling based on a rule of the set of rules.

In Example 27, the subject matter of Example 26 can optionally include wherein the hash table includes a cuckoo hash table.

In Example 28, the subject matter of Example 27 can optionally include wherein a hash table entry of the cuckoo hash table includes a field to indicate an age of the hash table entry.

In Example 29, the subject matter of Example 27 can optionally include operations to evict entries from the hash table according to a least recently used (LRU) policy based on an age entry of a hash table entry of the cuckoo hash table.

In Example 30, the subject matter of Example 27 can optionally include wherein the hash table entry includes a fingerprint, the fingerprint being comprised of a subset of the packet header.

In Example 31, an apparatus (e.g., computer, processor, network node, hardware switch, fabric interface, or other device, etc.) can include means to a communicate with one or more hardware switches to receive a data packet, the data packet including a packet header; means to use an unmasked key included in the packet header to retrieve, from a four-way cuckoo hash table, an index pointing to a sub-table, the sub-table including a set of rules for handling the respective data packet; and means forward the respective data packet for handling based on a rule of the set of rules.

In Example 32, the subject matter of Example 31 can optionally include means to store a plurality of hash table entries of the hash table, wherein the hash table comprises a cuckoo hash table, and wherein the hash table comprises at least two buckets of entries with each buck aligned with cache lines of 64 bytes.

In Example 33, the subject matter of any of claims 31-32 can optionally include means to evict entries from the hash table according to a least recently used (LRU) policy based on an age entry of a hash table entry of the hash table.

In Example 34, the subject matter of any of claims 31-33 can optionally include means to implement a tuple space search (TSS) responsive to detecting that the rule of the set of rules was not retrieved from the sub-table.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usage between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus comprising:
a memory device and
circuitry configured to:
generate a value based on a mask applied to bits, wherein the bits are based on a hash of a header of a data packet received from a network interface controller (NIC);
based on the value, determine a signature to identify an entry of a Cuckoo hash table, the Cuckoo hash table includes a set of one or more rules for handling the data packet;
based on a match of the signature with the entry of the Cuckoo hash table, access a rule from the set of one or more rules;
perform a tuple space search based on non-match of the signature with entries of the Cuckoo hash table; and
cause forwarding of the data packet based on the rule of the set of one or more rules.

2. The apparatus of claim 1, wherein the entry includes a field to indicate ages of the entry.

3. The apparatus of claim 2, wherein the entry includes a fingerprint, the fingerprint comprising a subset of the header of the data packet.

4. The apparatus of claim 1, wherein the circuitry is configured to evict entries from the Cuckoo hash table according to a least recently used (LRU) policy based on ages of the entries of the Cuckoo hash table.

5. The apparatus of claim 1, wherein the Cuckoo hash table comprises at least two buckets of entries, and wherein at least one bucket comprises a cache-aligned data structure.

6. The apparatus of claim 5, wherein the at least one bucket is aligned with a cache line.

7. The apparatus of claim 1, wherein the Cuckoo hash table comprises a first level filter that is to point to a sub-table and wherein the sub-table comprises the set of one or more rules for handling the data packet.

8. A method comprising:
receiving a data packet at a switch, the data packet including a packet header;
generating a value based on a mask applied to bits, wherein the bits are based on a hash of the packet header of the data packet;
based on the value, determining a signature to identify an entry of a Cuckoo hash table, the Cuckoo hash table including a set of one or more rules for handling the data packet;
based on a match of the signature with the entry of the Cuckoo hash table, accessing the rule from the set of one or more rules;
performing a tuple space search based on non-match of the signature with entries of the Cuckoo hash table; and
forwarding, by the switch to a processor core, the data packet based on a rule of the set of rules.

9. The method of claim 8, wherein the Cuckoo hash table includes a four-way cuckoo hash table.

10. The method of claim 9, wherein the four-way cuckoo hash table includes a field to indicate an age of the entry.

11. The method of claim 10, wherein the entry includes a fingerprint, the fingerprint comprising a subset of the packet header.

12. The method of claim 11, wherein the fingerprint includes two bytes, and wherein the fingerprint indicates identification information of the data packet.

13. The method of claim 8, further comprising:
evicting entries from the Cuckoo hash table according to a least recently used (LRU) policy based on ages of the entries of the Cuckoo hash table.

14. The method of claim 8, wherein the Cuckoo hash table comprises a first level filter that is to point to a sub-table and wherein the sub-table comprises the set of one or more rules for handling the data packet.

15. A non-transitory machine-readable medium including instructions that, when implemented on processing circuitry, cause the processing circuitry to:
receive a data packet, the data packet including a packet header;
generate a value based on a mask applied to bits, wherein the bits are based on a hash of a header of a data packet received from a network interface controller (NIC);
based on the value, determine a signature to identify an entry of a Cuckoo hash table including a set of one or more rules for handling the data packet;
based on a match of the signature with the entry of the Cuckoo hash table, access a rule from the set of one or more rules;
perform a tuple space search based on non-match of the signature with entries of the Cuckoo hash table; and
forward the data packet based on the rule of the set of one or more rules.

16. The non-transitory machine-readable medium of claim 15, wherein the entry of the Cuckoo hash table includes a field to indicate an age of the Cuckoo hash table entry.

17. The non-transitory machine-readable medium of claim 15, further comprising instructions to cause the processing circuitry to:
evict entries from the Cuckoo hash table according to a least recently used (LRU) policy based on ages of entries of the Cuckoo hash table.

18. The non-transitory machine-readable medium of claim 15, wherein the Cuckoo hash table comprises a first level filter that is to point to a sub-table and wherein the sub-table comprises the set of one or more rules for handling the data packet.

* * * * *